US010796368B2

(12) United States Patent
Olson et al.

(10) Patent No.: US 10,796,368 B2
(45) Date of Patent: Oct. 6, 2020

(54) ELECTRONIC DATA INSURANCE MANAGEMENT SYSTEM AND METHOD

(75) Inventors: Christopher Roderick Olson, Auckland (NZ); Ryan John Bothomley, Johannesburg (ZA); Gerard Francis Mackie, Whangaparaoa (NZ); Gregory Hugh Hodgkiss, Melbourne (AU); Thomas John O'Brien, Anthem, AZ (US)

(73) Assignee: CYBER INDEMNITY SOLUTIONS LIMITED, Auckland (NZ)

( * ) Notice: Subject to any disclaimer, the term of this patent is extended or adjusted under 35 U.S.C. 154(b) by 1368 days.

(21) Appl. No.: 14/363,496

(22) PCT Filed: Dec. 7, 2011

(86) PCT No.: PCT/US2011/063639
§ 371 (c)(1),
(2), (4) Date: Jun. 6, 2014

(87) PCT Pub. No.: WO2013/085500
PCT Pub. Date: Jun. 13, 2013

(65) Prior Publication Data
US 2014/0337061 A1   Nov. 13, 2014

(51) Int. Cl.
*G06Q 40/08* (2012.01)
*G06F 11/14* (2006.01)

(52) U.S. Cl.
CPC ......... *G06Q 40/08* (2013.01); *G06F 11/1458* (2013.01)

(58) Field of Classification Search
CPC .................................................... G06Q 40/08
USPC ................................................................ 705/4
See application file for complete search history.

(56) References Cited

U.S. PATENT DOCUMENTS

| 2002/0002475 A1* | 1/2002 | Freedman | G06Q 40/02 705/4 |
| 2002/0161609 A1* | 10/2002 | Zizzamia | G06Q 10/0635 705/4 |
| 2002/0188704 A1* | 12/2002 | Gold | G06F 21/10 709/221 |
| 2003/0028404 A1* | 2/2003 | Herron | G06Q 40/02 705/4 |
| 2006/0100912 A1 | 5/2006 | Kumar et al. | |
| 2009/0089254 A1 | 4/2009 | Von Kaenel et al. | |
| 2009/0276771 A1 | 11/2009 | Nickolov et al. | |

(Continued)

OTHER PUBLICATIONS

International Search Report and Written Opinion for PCT/US11/63639, dated Apr. 20, 2012, 12 pages.

*Primary Examiner* — Robert R Niquette
*Assistant Examiner* — Liz P Nguyen
(74) *Attorney, Agent, or Firm* — Brooks Kushman P.C.

(57) ABSTRACT

An electronic data insurance management system may prompt a user, for a selected insurance product, to identify an indemnity level for insuring against loss to one or more electronic data sets, receive input identifying the indemnity level, and link an identifier for one of the one or more electronic data sets with a data insurance policy or policy certificate defined by the identified indemnity level. The system may also create a data storage account for the one of the one or more electronic data sets on a data management system using the identifier such that an association is formed between the data storage account and the data insurance policy or policy certificate.

12 Claims, 6 Drawing Sheets

(56) References Cited

U.S. PATENT DOCUMENTS

2010/0250497 A1    9/2010   Redlich et al.
2011/0125648 A1*   5/2011   Price .................. G06F 21/55
                                                                             705/50

* cited by examiner

ELECTRONIC DATA INSURANCE MANAGEMENT SYSTEM AND METHOD

CROSS-REFERENCE TO RELATED APPLICATION

This application is the National Stage of International Application No. PCT/US2011/063639, filed Dec. 7, 2011, the disclosure of which is incorporated in its entirety by reference herein.

BACKGROUND

An individual's or business's electronic data may be of value. Typically, the cost to insure electronic data against loss would depend on factors such as the type of hardware/software used to store the data, the geographic location of the data, and the procedures used to manage the data. These factors, however, may vary from individual to individual and from business to business. Hence, determining the risk of data loss for a particular set of data and/or the insurance premiums associated with the actual risk of data loss for the particular set of data may be prohibitively expensive and/or onerous. Additionally, if a policy concerning risk to an insurer is defined via a forms based submission (a snapshot in time of an individual's or business's data protection standards), then that individual or business can be at risk of insurer claim rejection in the event of data loss should standards shift from the agreed upon standard by non-performance or non-adherence.

SUMMARY

An electronic data insurance management system includes at least one computing device that prompts a user, for a selected insurance product, to identify an indemnity level for insuring against loss to one or more electronic data sets, receives input identifying the indemnity level, and links an identifier for one of the one or more electronic data sets with a data insurance policy or policy certificate defined by the identified indemnity level. The at least one computing device also creates a data storage account for the one of the one or more electronic data sets on a data management system using the identifier such that an association is formed between the data storage account and the data insurance policy or policy certificate. The at least one computing device may prompt the user to select among a universe of maximum capacities for storage of the one or more electronic data sets, receive input selecting one of the maximum capacities, link at least a portion of the selected maximum capacity with the identifier, and set the storage capacity for the data storage account according to the selected maximum capacity. The selected insurance product may define the universe of maximum capacities for storage of the one or more electronic data sets. The at least one computing device may prompt the user to select one of a plurality of electronic data retention periods, receive input selecting one of the electronic data retention periods, and link the selected electronic data retention period with the identifier. The at least one computing device may prompt the user to select one of a plurality of insurance products and receive input selecting one of the plurality of insurance products. The selected insurance product and the identified indemnity level may define an insurance premium. The selected insurance product may determine the data management system. The selected insurance product may have an indemnity to premium ratio determined by characteristics of the data management system. The data management system may include redundant data centers. The characteristics of the data management system may include at least one of a number of the redundant data centers, a geographic distribution of the redundant data centers, a quality rating of each of the redundant data centers, and an infrastructure and operational standards of each of the redundant data centers.

A method for managing electronic data includes prompting a user, for a selected insurance product, to identify an indemnity level for insuring against loss to one or more electronic data sets, receiving input identifying the indemnity level, and linking an identifier for one of the one or more electronic data sets with a data insurance policy certificate defined by the identified indemnity level. The method also includes creating a data storage account for the one of the one or more electronic data sets on a data management system using the identifier, and forming an association between the data storage account and the data insurance policy or policy certificate via the identifier. The method may include prompting the user, for the selected insurance product, to select among a universe of maximum capacities for storage of the one or more electronic data sets, receiving input selecting one of the maximum capacities, linking at least a portion of the selected maximum capacity with the identifier, and setting the storage capacity for the data storage account according to the selected maximum capacity. The method may include prompting the user, for the selected insurance product, to select one of a plurality of electronic data retention periods, receiving input selecting one of the electronic data retention periods, and linking the selected electronic data retention period with the identifier. The method may include prompting the user to select one of a plurality of insurance products and receiving input selecting one of the plurality of insurance products. Prompting a user, for a selected insurance product, to identify an indemnity level for insuring against loss to one or more electronic data sets may include prompting the user to select among a universe of indemnity levels. The method may include receiving input defining the identifier.

DETAILED DESCRIPTION

Embodiments of the present disclosure are described herein; however, it is to be understood that the disclosed embodiments are merely examples and other embodiments may take various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, may be desired for particular applications or implementations.

Storing electronic data at a location and facility having known/controlled factors that impact the risk of data loss may substantially reduce the cost and assessment complexity of determining the risk of data loss and the associated insurer premiums. That is, electronic data insurance may be affordable and easily accessible by customer policy holders if the data to be insured is stored under controlled circumstances. In one scenario, individuals and businesses interested in obtaining data insurance may have a back-up copy of the data to be insured stored at one or more facilities whose risk profile is relatively low due to the type of hardware/software used to store the data, the location of the facility, etc. The loss of a back-up copy may then trigger recovery under the insurance.

In certain scenarios, a customer may be pre-approved for data insurance by an insurer at known standard insurer premium rates irrespective of the customer's information technology systems, procedures and infrastructure, if the insured data is backed-up on an insurer approved system. Policy holders may decide the value of their own data prior to data insurance policy purchase, and the price of the policy may be a function of the chosen insured value and (possibly) the volume of the stored data. The data insurance policy sales and distribution process may be coordinated by a system that manages the association between the insured client data (managed by external data systems) and the customer data insurance policy. Such a system may provide easily accessible data insurance products for sale by insurance agents while complying with regulated insurance practices and processes. Hence, potential financial risk to a third party service provider arising from loss of a customer's data the third party may have been responsible and liable for may be assumed by an insurer if the customer has valued and insured their data, and stored it using the insurer approved data storage system.

Some data insurance management systems may allow an insurance policy indemnity value to be assigned to one or more electronic sets of data owned by (or under the care of) a policy holder. A set of data defined by the policy holder may be stored by a data management account within an external data management backup system for insurer risk management purposes. The system may create one or more identifiers which are used to associate the data management accounts with the policy holder insurance policy or policy certificate. The system user (e.g., policy holder, agent, server, computer, etc.) may be able to select an insurance indemnity value for the policy or policy certificate associated with the defined sets of data via the one or more identifiers. The system may also create a data management account on an external data management backup system if an account does not exist, and associate the identifier with this data management account.

Figure 1:
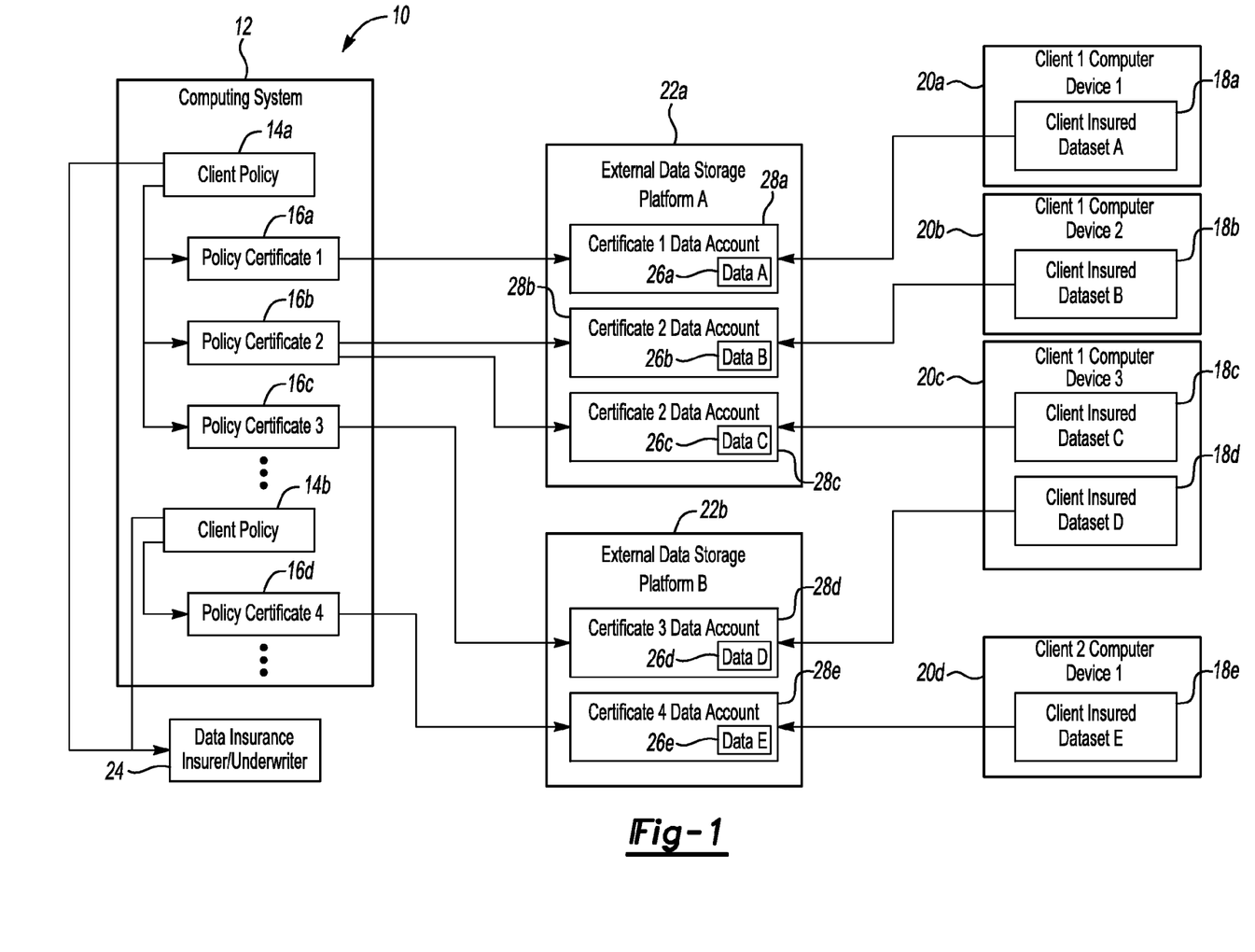
FIG. 1 is a schematic diagram illustrating the relationships between an insurance policy, a policy certificate, and policy holder's data.

Referring to FIG. 1, an electronic data insurance management system (eDIMS) 10 may include one or more computing devices 12 (e.g., computers, etc.) used to manage client data insurance policies 14$n$ (14$a$, 14$b$, etc.) and associated policy certificates 16$n$ (16$a$, 16$b$, etc.) that represent insured electronic data sets 18$n$ (18$a$, 18$b$, etc.) stored on one of client computer systems 20$n$ (20$a$, 20$b$, etc.)

eDIMS 10 may create and maintain client insurance policies 14$n$ specified by a client from a set of available policy types. Each policy 14$x$ (that is, policy 14$a$, policy 14$b$, etc.; similar notation is used throughout this disclosure) has one or many certificates 16$x$, which represent one or more insured electronic data sets 18$x$ belonging to the client and initially stored on at least one of the client computer systems 20$n$. Each policy certificate 16$x$ can have an individual associated maximum storage capacity and indemnity value.

Traditionally, an insurance policy certificate may have represented the user selected attributes of an insurance policy such as indemnity value, insured items, and specific terms regarding policy coverage. Examples of eDIMS policy certificates 16$x$, however, may specify indemnity coverage of a defined insured set of data, an external data management system that these sets of data are stored on, a maximum capacity allowable for the defined set of data, and other details relevant to the insured set of data.

In certain examples, a policy 14$x$ and policy certificate 16$x$ may be assumed to be a combined entity. The client 33 may be presented with the certificate and policy details in combined form.

To insure a client dataset 18$x$, it is backed up to a data backup management system 22$x$ (22$a$ or 22$b$, etc.) approved by an insurer 24. Each policy certificate 16$x$ may be associated with one or more specific data backup accounts 26$x$ (26$a$, 26$b$, etc.) on one of the specified data backup management systems 22$x$. Each of the data backup management systems 22$x$ then maintains the data backup connection and behavior with the client computer system dataset(s) 18$x$, which is represented by the individual insurance policy 14$x$ and insurance policy certificate 16$x$.

An individual computing device associated with the data backup management systems 22$n$ may store one or many datasets 26$n$ owned by one or many clients. Each of the data sets 26$x$ may be associated with a corresponding data backup account 28$x$ (28$a$ or 28$b$, etc.) maintained by one of the data backup management systems 22$x$, which may be in turn associated with a corresponding policy 14$x$ or policy certificate 16$x$ maintained by the one or more computing devices 12 and owned by a specific client.

An insurance policy 14$x$ may represent the wording of a specific insurance coverage intended for a set of insured data 26$x$ stored on defined data storage system 22$x$ and may be associated with one or more certificates 16$x$. Each certificate may be an expression of the attributes of insured data 26$x$, accounts 28$x$, and data storage platforms 22$x$ associated with the certificate. In certain configurations, a certificate 16$x$ may represent the attributes of all insured data 26x, accounts 28x, and data storage platforms 22x defined by a particular policy 14x.

The one or more computing devices 12 may maintain all information regarding client policies 14n and certificates 16n as well as records of data backup accounts and associated data backup management system events.

Figure 2:
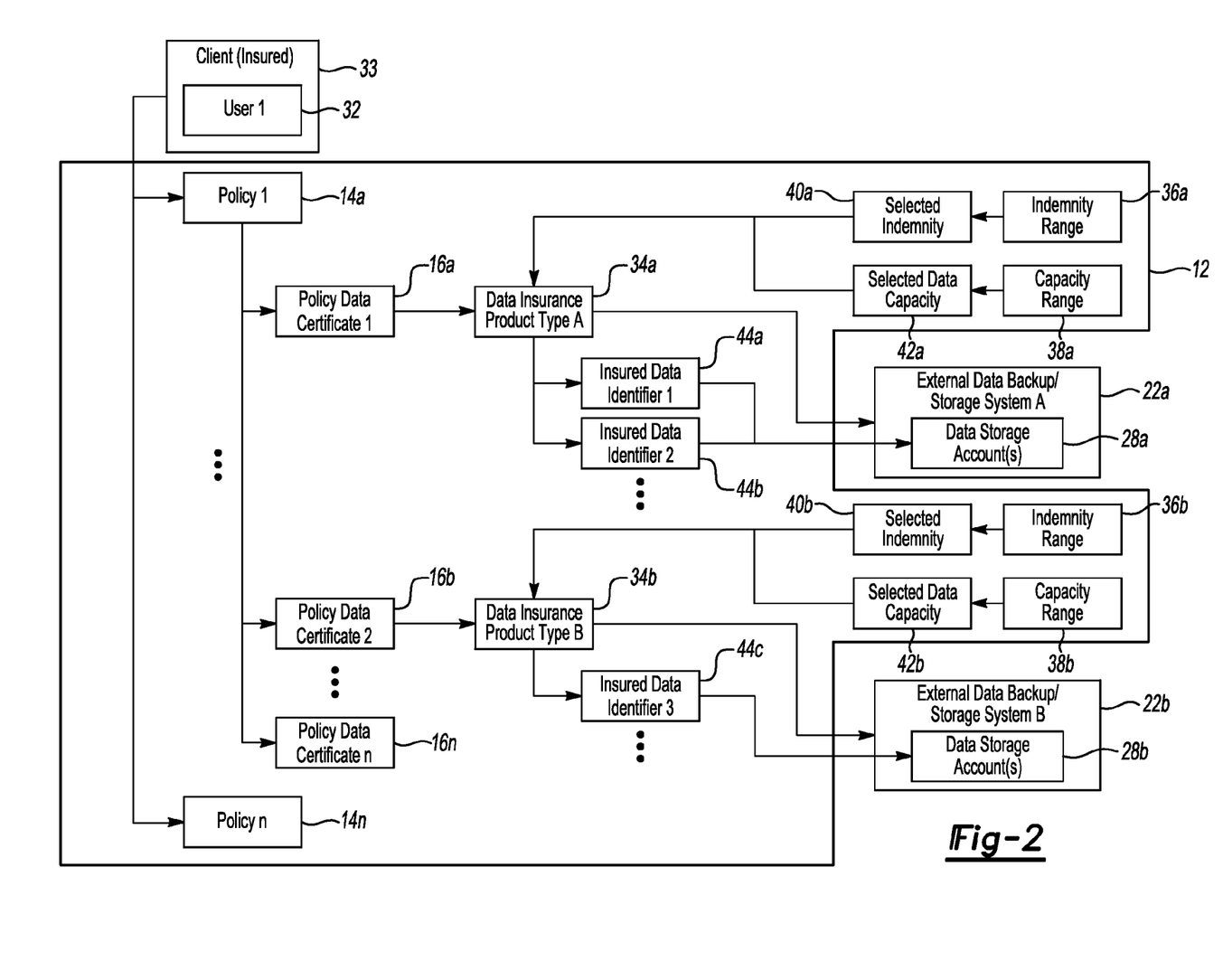
FIG. 2 is a schematic diagram illustrating the relationships between an insurance certificate, its product and associated characteristics, and a data management system.

Referring to FIGS. 1 and 2, a user 32 of a policy holder entity 33 can initiate the creation of a new insurance policy 14x or policy certificate 16x via the one or more computing devices 12 to insure a specific dataset 18x. The policy holder entity 33 may be a corporation, a private individual (e.g., the user 32), etc. In other examples, a broker or sales agent may create a policy holder entity and associated users. A broker or sales agent may also create policies and associated policy certificates on behalf of the policy holder entity to allow sales agents to sell and maintain data insurance policies to selected new policy holder entities.

The user 32 may initiate the creation of a new policy 14x for a specific client 33 by choosing from a number of available data insurance policy types maintained by the computing device 12. Each insurance policy type may be underwritten or issued by an insurer 24. In certain scenarios, the policy 14x may represent a contract type such as a product warranty.

The user 32 may configure/specify/add information to a new policy 14x or policy certificate 16x for a specific client 33 by choosing from a number of available data insurance products 34x, which may include the user selectable attributes indemnity 36x and data storage capacity 38x. In other examples, the user may specify the indemnity values to be recorded as a selected indemnity 40x associated with the client's insurance product 34x and stored in a data repository of the one or more computing devices 12.

The range of indemnity values 36x or data storage capacity values 38x that the user 32 can select from may be dependent on the user selected data insurance product 34x that will form the basis of the policy certificate 16x. The user 32 can select an appropriate indemnity value 40x or data storage capacity value 42x from the product based range of values 36x, 38x respectively. The indemnity value unit is typically currency and the data storage capacity value unit is typically bytes, usually expressed as Giga Bytes (GB).

The one or more computing devices 12 may record the user selected product type 34x and user selected product indemnity and data storage capacity attributes 40x, 42x with the associated policy certificate record 16x. Once the user 32 has selected from the available insurance products 34x, the user 32 may select from the insurance indemnity values 36x and the available data storage capacity values 38x for the selected insurance product 34x. The user selected values 40x, 42x may be associated with the client's insurance product 34x and stored in a data repository of the one or more computing devices 12. The user 32 can change the selected indemnity or data storage capacity attributes 40x, 42x for an existing policy certificate 16x. The one or more computing devices 12 may store the updated selected indemnity or data storage capacity attributes 40x, 42x.

In certain configurations, once the user 32 has selected from the available insurance products 34x, the user 32 may specify an indemnity value per data storage capacity value (usually expressed in $/GB) to be associated for the selected product 34x. The selected indemnity value 40x may be replaced by an indemnity value calculated by a mathematical formula using the user specified indemnity per data capacity value and the user selected data capacity 42x. The user selected value 42x and calculated value 40x may be associated with the client's insurance product 34x and stored in a data repository of the one or more computing devices 12. The user 32 can change the selected data storage capacity attribute 42x for an existing policy 14x or policy certificate 16x. The one or more computing devices 12 may calculate a new indemnity value 40x using the new data storage capacity attribute 42x and store the updated selected indemnity or data storage capacity attributes 40x, 42x.

When a new policy 14x or policy certificate 16x is created, and an associated product 34x is selected, one or more data set identifiers 44x may be created and associated with the product record corresponding with the policy certificate 16x.

A data set identifier 44x may be used to identify a specific physical dataset 26x that is insured as per the associated policy 14x and policy certificate 16x, and user selected indemnity or data storage capacity values 40x, 42x. The data set identifier 44x, in certain arrangements, is logged in the external data backup management system 22x against the insured data account record 28x to link the insured physical data 26x to the insurance policy certificate record 16x stored in the one or more computing devices 12.

A data set identifier 44x ensures that the insured policy certificate 16x can be linked to a physical dataset 26x managed by the external data backup management system 22x. The one or more computing devices 12 can initiate automated communication and control of specific datasets 26x via the external data backup management system 22x via known/suitable information technology interface standards and using the data set identifier 44x to identify the target physical dataset 26x via the data account 28x.

A data set identifier 44x may represent a bounded set of data 26x maintained by the data storage system 22x defined by a data account 28x. Examples of data 26x within a data account 28x may be a defined data set such as a database, a file system, or a group of file systems or data sets from multiple computer devices.

When a new policy 14x or policy certificate 16x is created by the one or more computing devices 12 with one or more associated data set identifiers 44x, the one or more computing devices 12 may create a new dataset account or record 28x on a specific external data backup/storage system 22x via known/suitable information technology interface standards and using the data set identifier 44x to identify the new physical dataset record 26x.

The user selected insurance product 34x associated with a policy certificate 16x may specify the particular external data backup management system 22x that the dataset record 28x is to be created on. The configuration of data backup management software to specify the content of a particular dataset 26x may be managed by the user 32 externally to the one or more computing devices 12.

One or more data set identifiers 44x may be created by the user 32 after the policy 14x or certificate 16x has been created. A user 32 may delete a data set identifier 44x as required.

The user selected data storage capacity value 42x associated with the insurance product 34x may be used by the one or more computing devices 12 to set a data capacity limit for the data stored on the relevant external data backup/storage system 22x defined by the data set identifiers 44x associated with the product 34x. In certain configurations, a data set identifier 44x may have a data storage capacity attribute whose value is set by the user 32. In such configurations, the data capacity attribute associated with the data set identifier 44x may be used to set/update the data storage capacity limit for the associated data storage account 28x. A notification may also be sent to the user 32 to notify them of the change.

An insurance product type 34x can be configured in the one or more computing devices 12 to allow a user to input a data set identifier 44x for an existing dataset 26x or data set record 28x managed by the external data backup management system 22x. The user entered data set identifier 44x may be recorded by the one or more computing devices 12 and associated with an insurance product 34x that is configured to request user input of a dataset identifier 44x. The user entered data set identifier 44x may be associated with the policy certificate record 16x and may be used by the one or more computing devices 12 to interface to the particular physical dataset record 26x managed by the external data backup management system 22x associated with the selected insurance product 34x.

This facility allows the one or more computing devices 12 to 'wrap' a policy 14x or policy certificate 16x over an existing physical dataset 26x managed by a particular external data backup management system 22x. This allows insurance policies to be retrospectively applied to data backup management accounts that have been previously created on the external data backup/storage systems 22n.

Figure 3:
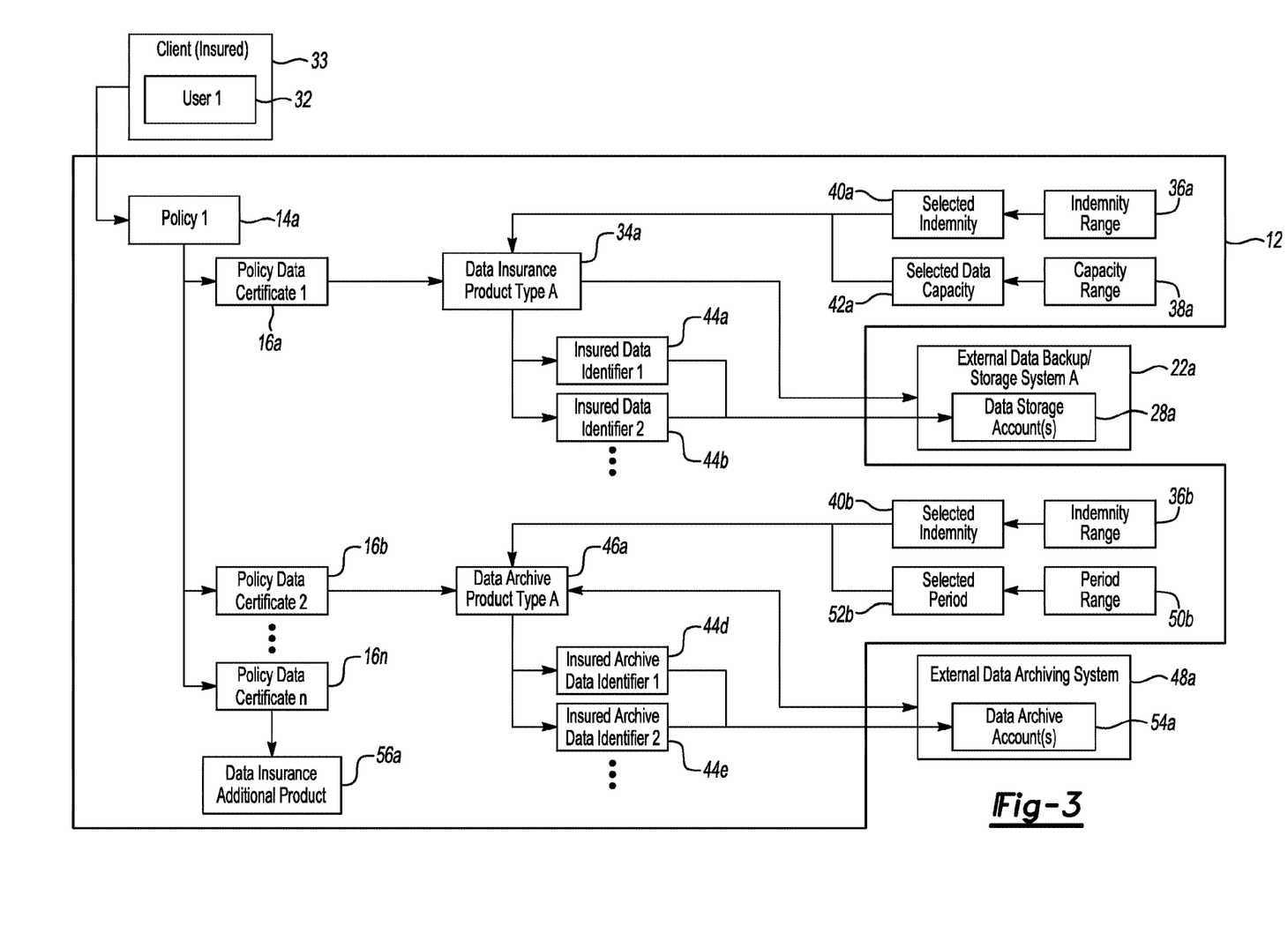
FIG. 3 is a schematic diagram illustrating the relationships between an insurance certificate, its data archive product and associated characteristics, and a data archive management system.

Referring to FIGS. 1 and 3, a data archiving product 46x can be added to a policy certificate 16x by the user 32. The data archiving product 46x may be similar to the data insurance product 34x but specifies an external data archiving system 48x instead of an external data backup/ storage system 22x.

When the user 32 adds a data archiving product 46x, the user 32 may select from a preconfigured range of available data retention period values 50x to generate a selected period value 52x. The user selected data archiving product 46x associated with the policy certificate 16x may specify the particular external data archiving system 48x that a data archive record 54x is to be created on.

One or more data set identifiers 44x may be created and associated with a data archive product 46x. In this scenario, a data set identifier 44x may be linked to an associated data archive account record 54x maintained by an external data archiving system 48x.

The data set identifier 44x may be logged in the external data archiving system 48x against the insured data archive record 54x to link the insured physical archive data to the existing insurance policy 14x or policy certificate record 16x stored in the one or more computing devices 12. The user selected data archiving product retention period value 52x associated with the insurance data archiving product 46x and data set identifiers 44x may be used by the one or more computing devices 12 to set the associated data archiving record maximum retention period limit on the relevant external data archiving system 48x.

When the user 32 changes the data archiving product retention period value 52x of an insurance data archiving product 46x, the one or more computing devices 12 may update the physical data archive record maximum retention period limit to the changed data archiving product value using each of the one or more associated data set identifiers 44x to identify the target archive records 54x maintained by the relevant external data archiving system 48x.

Additional insurance products 56x can be preconfigured in the one or more computing devices 12 to allow the user 32 to add these to an existing policy certificate 16x. An example is an on site data restoration service or offsite disaster recovery service insurance or warranty product. The user 32 can add one of these insurance products 56x to an existing policy certificate 16x.

Each insurance product 46x, 56x may have an associated preconfigured range of available indemnity values. The range of insurance product indemnity values that the user 32 can select from may depend on the user selected insurance product. The indemnity value unit may be currency.

Figure 4:
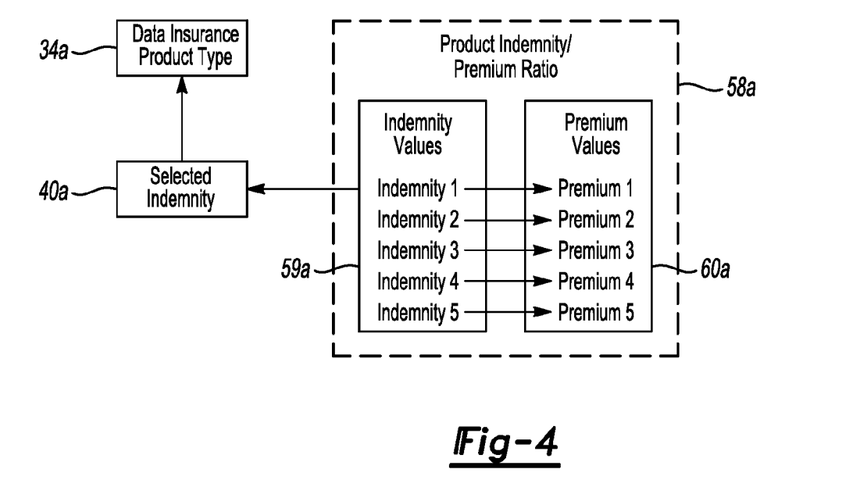
FIG. 4 is a schematic diagram illustrating an indemnity premium ratio and its relationship with a data insurance product.

Referring to FIGS. 1, 3 and 4, each data insurance product 34x (and other products 46x, 56x) stored in the one or more computing devices 12 may be configured with a unique set of data insurance product premium to indemnity ratios 58x. Each available user selectable indemnity value 59x for a particular data insurance product 34x may be associated with one of a corresponding range of insurance premium values 60x. The insurance premium value unit may be currency. The relationship between the indemnity value 59x and the insurance premium values 60x may be calculated using a mathematical formula to facilitate the user recording a required indemnity value 59x and the associated insurance premium values 60x being calculated.

When the user 32 selects an available indemnity value 40x for a particular data insurance product 34x, the one or more computing devices 12 may assign the associated insurance premium value 60x to the particular data insurance product 34x. This premium value 60x may be used to calculate the policy or policy certificate premium chargeable to the policy holder (insured).

Figure 5:
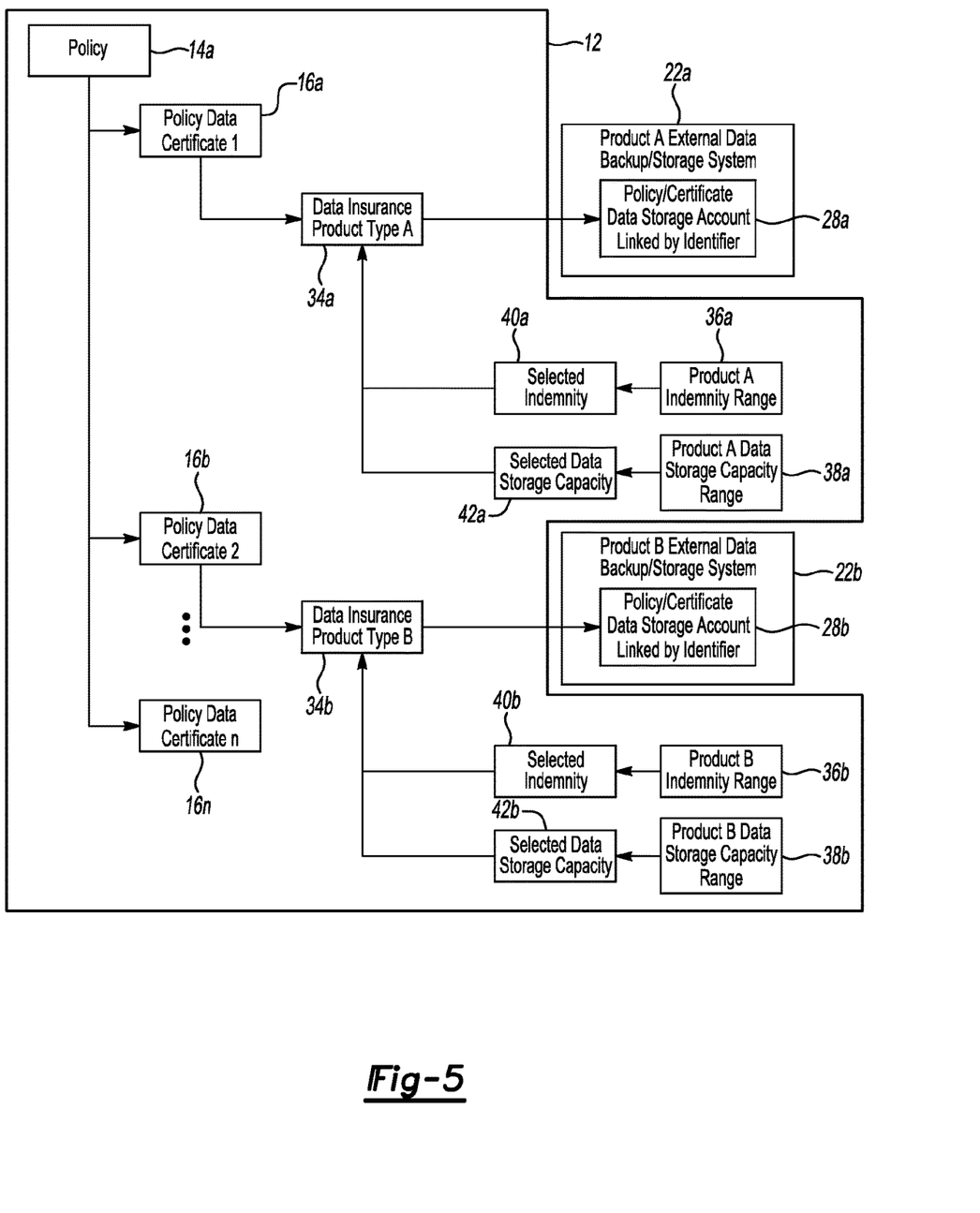
FIG. 5 is a schematic diagram illustrating multiple certificate products and associated specifications, features, and data management systems.

Referring to FIG. 5, the one or more computing devices 12 can store multiple data insurance product types 34x, each of which can be selected by the user 32 to be associated with a policy certificate 16x.

Each data insurance product 34x may be configured with a range or universe of data storage maximum capacity values 38x. The user 32 can select from the available range of data storage maximum capacity values 38x for a particular data insurance product 34x. The user selected data storage maximum capacity value 42x may be assigned to the particular data insurance product instance 34x associated with the insured policy certificate 16x. The one or more computing devices 12 may use the user selected data storage maximum capacity value 42x to set the maximum data storage capacity of the physical backup/storage dataset 26x managed by the external data backup management system 22x.

The particular target dataset 26x may be identified by the one or more associated policy certificate data set identifiers 44x while the particular external data backup management system 22x may be identified by the policy certificate data insurance product type 34x.

Each data insurance product 34x may be configured with a range or universe of indemnity values 36x. The user 32 can select from the available range of indemnity values 36x for a particular data insurance product 34x.

The user selected indemnity value 40x may be assigned to the particular data insurance product instance 34x associated with the insured policy certificate 16x. The user selected indemnity value 40x, in certain arrangements, is the total insured indemnity currency value for the one or more associated physical datasets 26x managed by the external data backup management system 22x. The associated physical datasets 26x may be identified by the one or more data set identifiers 44x associated with a policy certificate 16x.

Figure 6:
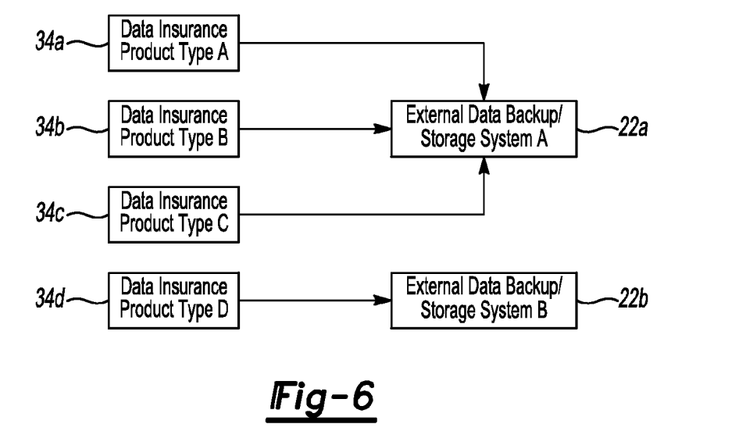
FIG. 6 is a schematic diagram illustrating multiple certificate products being associated with a data management system.

Referring to FIG. 6, each data insurance product 34x may be associated with a particular external data backup management system 22x. Multiple data insurance products 34a, 34b, 34c, for example, may be associated with the single external data backup management system 22a. A data insurance product 34x may communicate with its associated external data backup management system 22x via a standard/known/suitable interface technology to provision data backup/storage accounts 28x and to gather information regarding the physical dataset records 26x.

Figure 7:
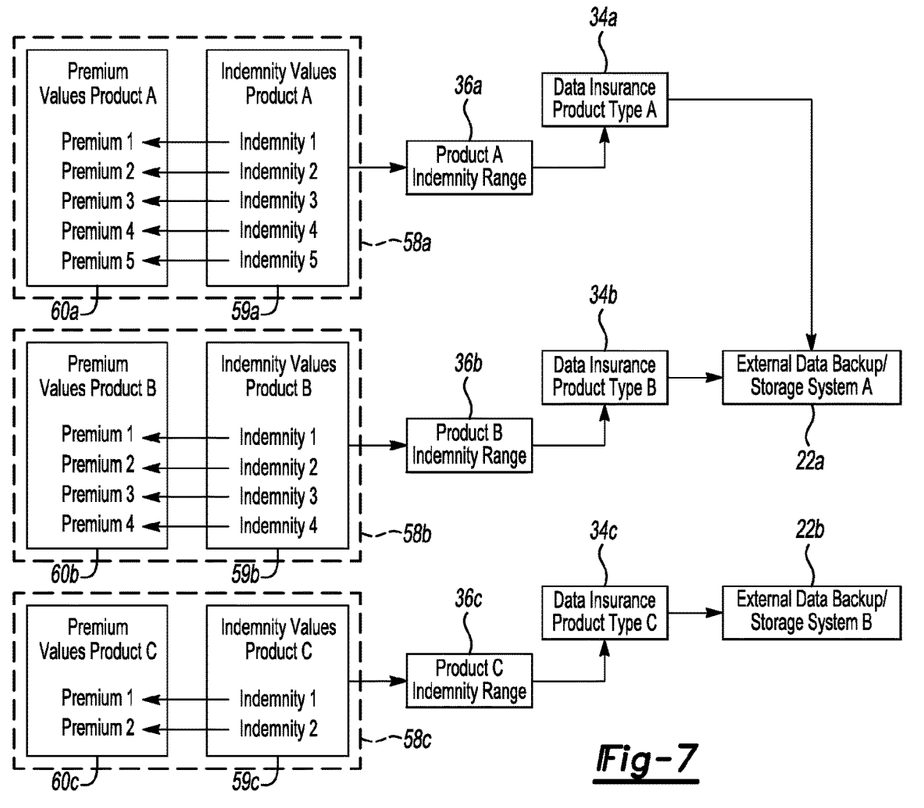
FIG. 7 is a schematic diagram illustrating a specific premium indemnity ratio set associated with a certificate product.
Figure 8:
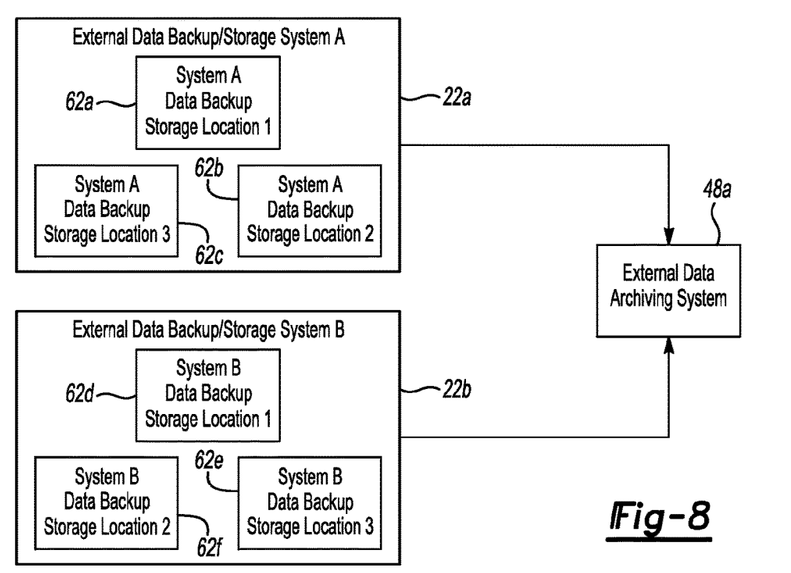
FIG. 8 is a schematic diagram illustrating the relationships between multiple data management systems.

Referring to FIGS. 1, 2 and 7, a data insurance product 34x may be associated with a particular external data backup management system 22x, which is assessed or audited for its level of risk of failure against standards agreed with the underwriter 24 of a particular data insurance product 34x. Specific factors that influence the risk assessment may include the composition of software applications, particular hardware components, system hosting datacenters, data transmission links, and provided technical services. The result of the external data backup management system risk audit will allow the underwriter 24 to calculate the required chargeable premium for each level of indemnity associated with a particular data insurance product 34x and available to be selected by the user 32.

Each of specific data insurance product range of available indemnity values 59x may be associated with an underwriter specified premium value 60x, which reflects the assessed risk of a data insurance product indemnity value 59x based on the associated external data backup management system configuration and quality.

A particular external data backup management system 22x may be associated with more than a single data insurance product 34x and each of these data insurance products 34x may be configured in the one or more computing devices 12 with unique insurance indemnity to premium ratios 58x.

Referring to FIGS. 1, 2, 7 and 8, a particular external data backup/management system 22x may be hosted by multiple datacenters 62x which are geographically distributed. Each of these datacenters 62x may be assessed for the services it provides, which are reflected in the achieved rating for each particular datacenter 62x. In addition to the risk assessment or audit described above, additional factors specific to the hosting and location of the components of each particular external data backup management system 22x are factored for its level of risk of failure due to natural disaster, acts of terrorism, etc. The results of these location dependent datacenter assessments may be used by the data insurance product underwriter 24 to calculate the required chargeable premium 60x for each level of indemnity 59x associated with the particular data insurance product 34x and made available to be selected by the user 32. If a data insurance product 34x is associated with a particular external data backup management system 22x, it may in turn be hosted by multiple datacenters 62x which are geographically distributed.

Referring to FIGS. 1, 3, 5, 6 and 8, information can be collated by the computing devices 12 to report information in various configurations to the user 32, client 33 and insurer 24 relating insurance policy indemnity risk values for selected entities. Examples of possible reported information configurations include: (1) the data volume (GB) stored at a specified storage location 62x for a specified set of client policies 14x or certificates 16x; (2) the policy indemnity value associated with a specified set of external data backup systems 22x; (3) the policy indemnity value associated with data stored at a specified set of data backup storage locations 62x; (3) the policy indemnity value associated with a particular insurer 24; and/or (4) the policy indemnity associated with a specified set of products 34x. The user 32 may, of course, configure the computing devices 12 to report information in various configurations utilizing all information recorded therein.

The processes, methods, or algorithms disclosed herein may be deliverable to/implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, they may be embodied in whole or in part using suitable hardware components, such as Application Specific Integrated Circuits (ASICs), Field-Programmable Gate Arrays (FPGAs), state machines, or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure and claims. As previously described, the features of various embodiments may be combined to form further embodiments of the invention that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to: cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An electronic data insurance management system comprising:
　at least one computing device configured to
　　prompt a user, for a selected insurance product, to identify an indemnity level for insuring against loss to one or more electronic data sets,
　　receive input identifying the indemnity level,
　　link an identifier for one of the one or more electronic data sets with a data insurance policy or policy certificate defined by the identified indemnity level,
　　create a data storage account for the one of the one or more electronic data sets on a data management system using the identifier such that an association is formed between the data storage account and the data insurance policy or policy certificate,
　　prompt the user to select among a universe of maximum capacities for storage of the one or more electronic data sets that is defined by the selected insurance product,
　　receive input selecting one of the maximum capacities,
　　link at least a portion of the selected maximum capacity with the identifier, and set the storage capacity for the data storage account according to the selected maximum capacity.

2. The electronic data insurance management system of claim 1, wherein the at least one computing device is further configured to prompt the user to select one of a plurality of electronic data retention periods, to receive input selecting one of the electronic data retention periods, and to link the selected electronic data retention period with the identifier.

3. The electronic data insurance management system of claim 1, wherein the at least one computing device is further configured to prompt the user to select one of a plurality of insurance products and to receive input selecting one of the plurality of insurance products.

4. The electronic data insurance management system of claim 1, wherein the selected insurance product and the identified indemnity level define an insurance premium.

5. The electronic data insurance management system of claim 1, wherein the selected insurance product determines the data management system.

6. The electronic data insurance management system of claim 1, wherein the selected insurance product has an indemnity to premium ratio determined by characteristics of the data management system.

7. The electronic data insurance management system of claim 6, wherein the data management system includes redundant data centers and wherein the characteristics of the data management system include at least one of a number of the redundant data centers, a geographic distribution of the redundant data centers, a quality rating of each of the redundant data centers, and an infrastructure and operational standards of each of the redundant data centers.

8. A method for managing electronic data comprising:
  prompting a user, for a selected insurance product, to identify an indemnity level for insuring against loss to one or more electronic data sets;
  receiving input identifying the indemnity level;
  linking an identifier for one of the one or more electronic data sets with a data insurance policy certificate defined by the identified indemnity level;
  creating a data storage account for the one of the one or more electronic data sets on a data management system using the identifier;
  forming an association between the data storage account and the data insurance policy or policy certificate via the identifier;
  prompting the user to select among a universe of maximum capacities for storage of the one or more electronic data sets that is defined by the selected insurance product;
  receiving input selecting one of the maximum capacities;
  linking at least a portion of the selected maximum capacity with the identifier; and
  setting the storage capacity for the data storage account according to the selected maximum capacity.

9. The method of claim 8 further comprising prompting the user, for the selected insurance product, to select one of a plurality of electronic data retention periods, receiving input selecting one of the electronic data retention periods, and linking the selected electronic data retention period with the identifier.

10. The method of claim 8 further comprising prompting the user to select one of a plurality of insurance products and receiving input selecting one of the plurality of insurance products.

11. The method of claim 8, wherein prompting a user, for a selected insurance product, to identify an indemnity level for insuring against loss to one or more electronic data sets includes prompting the user to select among a universe of indemnity levels.

12. The method of claim 8 further comprising receiving input defining the identifier.

* * * * *